(12) United States Patent
Gossage et al.

(10) Patent No.: US 8,103,081 B2
(45) Date of Patent: Jan. 24, 2012

(54) CLASSIFICATION OF SAMPLES

(75) Inventors: Kirk William Gossage, Milford, CT (US); Tyna A. Hope, Wakefield, MA (US)

(73) Assignee: Cambridge Research & Instrumentation, Inc., Woburn, MA (US)

( * ) Notice: Subject to any disclaimer, the term of this patent is extended or adjusted under 35 U.S.C. 154(b) by 519 days.

(21) Appl. No.: 12/401,430

(22) Filed: Mar. 10, 2009

(65) Prior Publication Data

US 2009/0257640 A1 Oct. 15, 2009

Related U.S. Application Data

(60) Provisional application No. 61/035,240, filed on Mar. 10, 2008, provisional application No. 61/045,402, filed on Apr. 16, 2008.

(51) Int. Cl.
*G06K 9/00* (2006.01)

(52) U.S. Cl. .......................... 382/133; 356/36; 600/407

(58) Field of Classification Search .......... 382/128–134, 382/162; 356/36, 300, 369, 453, 465; 600/407, 600/476

See application file for complete search history.

(56) References Cited

U.S. PATENT DOCUMENTS

| | | | | |
|---|---|---|---|---|
| 6,421,131 | B1 * | 7/2002 | Miller | 356/453 |
| 6,466,687 | B1 * | 10/2002 | Uppaluri et al. | 382/128 |
| 6,920,239 | B2 * | 7/2005 | Douglass et al. | 382/128 |
| 6,924,893 | B2 * | 8/2005 | Oldenbourg et al. | 356/369 |
| 2005/0216204 | A1 | 9/2005 | Yener et al. | |
| 2006/0036372 | A1 | 2/2006 | Yener et al. | |
| 2006/0245631 | A1 | 11/2006 | Levenson et al. | |

OTHER PUBLICATIONS

Coleman et al., "Syntactic structure analysis in uveal melanomas," Brit. J. Ophthalmology 78: 871-874 (1994).
Choi et al., "Minimum spanning trees (MST) as a tool for describing tissue architecture when grading bladder carcinoma," Proc. 8th Int. Conf. on Image Analysis and Processing (San Remo, Italy), pp. 615-620 (1995).
Geusebroek et al., "Segmentation of Tissue Architecture by Distance Graph Matching," Cytometry 35(1): 12-22 (1999).
Sudbø et al., "New algorithms based on the Voronoi Diagram applied in a pilot study on normal mucosa and carcinomas," Analytical Cellular Pathology 21(2): 71-86 (2000).
Sudbø et al., "Prognostic Value of Graph Theory-Based Tissue Architecture Analysis in Carcinomas of the Tongue," Laboratory Investigation 80(12) (2000).
Gunduz et al., "The cell-graphs of cancer," Bioinformatics 20 Supp. 1: i145-i151 (2004).
Takahashi et al., "Support Systems for Histopathologic Diagnosis of Hepatocellular Carcinoma Using Nuclear Positions," Proc. 2nd Annual IASTED Conf. Biomed. Eng., pp. 219-223 (2004).
Demir et al., "Augmented cell-graphs for automated cancer diagnosis," Bioinformatics 21 Supp. 2: ii7-ii12 (2005).
Demir et al., "Learning the Topological Properties of Brain Tumors," IEEE/ACM Trans. Comp. Biol. Bioinf. 2(3): 262-270 (2005).

(Continued)

*Primary Examiner* — Seung C Sohn
(74) *Attorney, Agent, or Firm* — Fish & Richardson P.C.

(57) ABSTRACT

Methods disclosed herein include: (a) determining positions of a plurality of cells based on one or more images of the cells; (b) for at least some of the plurality of cells, generating a matrix that includes two-dimensional information about positions of neighboring cells, and determining one or more numerical features based on the information in the matrix; and (c) classifying the at least some of the plurality of cells as belonging to at least one of multiple classes based on the numerical features.

94 Claims, 8 Drawing Sheets

OTHER PUBLICATIONS

Demir et al., "Spectral analysis of cell-graphs for automated cancer diagnosis," 4th Conf. on Modeling and Simulation in Biology, Medicine, and Biomedical Engineering (Linkoping, Sweden), 2005.

Landini et al., "Quantification of Local Architecture Changes Associated with Neoplastic Progression in Oral Epithelium using Graph Theory," *Fractals in Biology and Medicine IV* (Losa et al., eds.), pp. 193-201 (Birkhauser, 2005).

Petushi et al., "Large-scale computations on histology images reveal grade-differentiating parameters for breast cancer," BMC Med. Imaging, pp. 6-14 (2006).

Bilgin et al., "Cell-Graph Mining for Breast Tissue Modeling and Classification," IEEE Eng. Med. Biol. Soc. 1: 5311-5314 (2007).

Doyle et al., "Automated Grading of Prostate Cancer Using Architectural and Textural Image Features," IEEE International Symposium on Biomedical Imaging (ISBI), pp. 1284-1287 (2007).

Gunduz-Demir, "Mathematical modeling of the malignancy of cancer using graph evolution," Mathematical Biosciences 209(2): 514-527 (2007).

Lin et al., "Automated image analysis methods for 3-D quantification of the neurovascular unit from multichannel confocal microscope images," Cytometry A 66A(1): 9-23.

\* cited by examiner

CLASSIFICATION OF SAMPLES

CROSS-REFERENCE TO RELATED APPLICATIONS

This application claims priority to U.S. Provisional Patent Application Ser. No. 61/035,240, filed on Mar. 10, 2008, and to U.S. Provisional Patent Application Ser. No. 61/045,402, filed on Apr. 16, 2008. The entire contents of each of these provisional applications are incorporated by reference herein.

TECHNICAL FIELD

This disclosure relates to classification of biological samples, and in particular, to classification of disease states in cells.

BACKGROUND

Manual inspection and classification of biological samples can be both time consuming and prone to errors that arise from the subjective judgment of a human technician. As an alternative, automated classification systems can be used to examine biological samples such as tissue biopsies to provide information for clinical diagnosis and treatment.

SUMMARY

In general, in a first aspect, the disclosure features a method that includes: (a) determining positions of a plurality of cells based on one or more images of the cells; (b) for at least some of the plurality of cells, generating a matrix that includes two-dimensional information about positions of neighboring cells, and determining one or more numerical features based on the information in the matrix; and (c) classifying the at least some of the plurality of cells as belonging to at least one of multiple classes based on the numerical features.

Embodiments of the method can include one or more of the following features.

Determining positions of a plurality of cells can include determining positions of nuclei of the cells. The positions of the nuclei can be determined automatically from the one or more images.

The matrix can include information about positions of the nuclei of neighboring cells relative to the nucleus of a cell corresponding to the matrix. The matrix can include information about positions of the nuclei of neighboring cells as a function of distance between the neighboring nuclei and the nucleus of the cell corresponding to the matrix. Alternatively, or in addition, the matrix can include information about positions of the nuclei of neighboring cells as a function of angular orientation relative to the nucleus of the cell corresponding to the matrix.

The matrix can include information about positions of the nuclei of neighboring cells as a function of distance along a first coordinate axis between the neighboring nuclei and the nucleus of the cell corresponding to the matrix, and the matrix can include information about positions of the neighboring cells as a function of distance along a second coordinate axis between the neighboring nuclei and the nucleus of the cell corresponding to the matrix, the second coordinate axis being orthogonal to the first coordinate axis.

Determining positions of a plurality of cells can include determining positions of one or more structural features of the cells. The one or more structural features can include a cellular membrane. The one or more structural features can include two or more structural features.

The two-dimensional information can include position information as a function of two quantities, where the matrix includes a first dimension corresponding to one of the quantities and a second dimension corresponding to the other of the quantities. The two-dimensional information can vary as a function of one of the quantities along the first dimension of the matrix, and the two-dimensional information can vary as a function of the other quantity along the second dimension of the matrix.

The at least one of multiple classes can include two classes. The two classes can correspond to cancerous cells and non-cancerous cells.

The at least one of multiple classes can include more than two classes.

The one or more numerical features can include at least one one-dimensional feature derived from a distribution of the positions of neighboring cells. The distribution can be derived from the elements of the matrix. For example, the distribution can be derived by summing elements along one dimension of the matrix.

The at least one one-dimensional feature can be derived from a distribution of the positions of neighboring cells as a function of distance between the neighboring cells and a cell corresponding to the matrix. The at least one one-dimensional features can be derived from a distribution of the positions of neighboring cells as a function of angular orientation relative to a cell corresponding to the matrix.

The at least one one-dimensional feature can include a mean of the positions of neighboring cells. Alternatively, or in addition, the at least one one-dimensional feature can include a standard deviation of the positions of neighboring cells. Alternatively, or in addition, the at least one one-dimensional feature can include a median of the positions of neighboring cells. Alternatively, or in addition, the at least one one-dimensional feature can include a mode of the positions of neighboring cells.

The one or more numerical features can include at least one two-dimensional feature derived from a distribution of the positions of neighboring cells. The distribution can be derived from the elements of the matrix.

The at least one two-dimensional feature can be derived from a distribution of the positions of neighboring cells as a function of distance between the neighboring cells and a cell corresponding to the matrix, and as a function of angular orientation of the neighboring cells relative to the cell corresponding to the matrix.

The at least one two-dimensional feature can be derived from a distribution of the positions of neighboring cells as a function of distance between the neighboring cells and a cell corresponding to the matrix along a first coordinate direction, and as a function of distance between the neighboring cells and the cell corresponding to the matrix along a second coordinate direction orthogonal to the first coordinate direction.

The at least one two-dimensional feature can include a measure of entropy based on the distribution of the positions of neighboring cells. Alternatively, or in addition, the at least one two-dimensional feature can include a measure of uniformity based on the distribution of the positions of neighboring cells. Alternatively, or in addition, the at least one two-dimensional feature can include a measure of density based on the distribution of the positions of neighboring cells.

The one or more numerical features can include at least one one-dimensional feature and at least one two-dimensional feature, the features being derived from a distribution of the positions of neighboring cells. The at least one one-dimensional feature and the at least one two-dimensional feature can be derived from a distribution of the positions of neighboring cells, as a function of relative distance and angular orientation between the neighboring cells and a cell that corresponds to the matrix. Alternatively, or in addition, the at least one one-dimensional feature and the at least one two-dimensional feature can be derived from a distribution of the positions of neighboring cells, as a function of relative distance along each of two orthogonal coordinate directions, between the neighboring cells and a cell that corresponds to the matrix. The at least one one-dimensional feature can include at least one of a mean, a standard deviation, a median, and a mode of a distribution of the positions of neighboring cells, as a function of distance between the neighboring cells and a cell that corresponds to the matrix. Alternatively, or in addition, the at least one one-dimensional feature can include at least one of a mean, a standard deviation, a median, and a mode of a distribution of the positions of neighboring cells, as a function of an angular orientation of the neighboring cells relative to a cell that corresponds to the matrix. The at least one two-dimensional feature can include at least one of a measure of entropy, a measure of uniformity, and a measure of density, based on the distribution of the positions of neighboring cells.

The method can include determining pixel texture information for the at least some of the plurality of cells, and classifying the at least some of the plurality of cells based on the pixel texture information. The pixel texture information can include first-order pixel texture information. The first-order pixel texture information can include one or more of a mean, a median, a mode, a standard deviation, and a surface area that are determined based on intensity values of pixels in regions of the one or more images that correspond to the cells.

The pixel texture information can include second-order pixel texture information. The second-order pixel texture information can include one or more of a measure of entropy, a measure of uniformity, and a measure of density that are determined based on intensity values of pixels in regions of the one or more images that correspond to the cells.

The one or more images of the cells can be derived from a set of multispectral sample images. The set of multispectral sample images can be spectrally unmixed to produce the one or more images of the cells.

The one or more images of the cells can be derived from a set of red-green-blue (RGB) sample images. The set of RGB sample images can include a single RGB image. Alternatively, the set of RGB sample images can include two or more RGB images. The set of RGB sample images can be spectrally unmixed to produce the one or more images of the cells. The set of RGB sample images can be decomposed to produce the one or more images of the cells without spectral unmixing. The set of RGB sample images can be decomposed to produce the one or more images of the cells, and the decomposition can include optical density conversion of the set of RGB sample images.

The one or more images of the cells can include a single image derived from a set of multispectral sample images. The one or more images of the cells can include a single image derived from a set of RGB sample images.

The method can also include any of the other steps and/or features disclosed herein, as appropriate.

In another aspect, the disclosure features a method that includes: (a) determining positions of a plurality of cells based on one or more images of the cells; (b) for at least some of the plurality of cells, determining a distribution of neighboring cells as a function of relative angular orientation of the neighboring cells, and determining one or more numerical features from the distribution; and (c) classifying the at least some of the plurality of cells as belonging to at least one of multiple classes based on the numerical features.

Embodiments of the method can include one or more of the following features.

Determining positions of a plurality of cells can include determining positions of nuclei of the cells. The positions of the nuclei can be determined automatically from the one or more images.

Determining positions of a plurality of cells can include determining positions of one or more structural features of the cells.

The method can include determining a second distribution of neighboring cells as a function of relative distance to the neighboring cells, determining one or more numerical features from the second distribution, and classifying the at least some of the plurality of cells based on numerical features determined from the second distribution.

The method can include, for each of the at least some of the plurality of cells, generating a matrix that includes information about the relative angular orientation of neighboring cells. The matrix can include information about relative distance to the neighboring cells.

The distribution of neighboring cells as a function of relative angular orientation of the neighboring cells can be determined from elements of the matrix.

The at least one of multiple classes can include two classes. The two classes can correspond to cancerous cells and non-cancerous cells.

The at least one of multiple classes can include more than two classes.

The one or more numerical features can include a mean of the positions of neighboring cells as a function of the relative angular orientation of the neighboring cells. Alternatively, or in addition, the one or more numerical features can include a standard deviation of the positions of neighboring cells as a function of the relative angular orientation of the neighboring cells. Alternatively, or in addition, the one or more numerical features can include a median of the positions of neighboring cells as a function of the relative angular orientation of the neighboring cells. Alternatively, or in addition, the one or more numerical features can include a mode of the positions of neighboring cells as a function of the relative angular orientation of the neighboring cells.

The one or more numerical features determined from the second distribution can include a mean of the positions of neighboring cells as a function of the relative distance to the neighboring cells. Alternatively, or in addition, the one or more numerical features determined from the second distribution can include a standard deviation of the positions of neighboring cells as a function of the relative distance to the neighboring cells. Alternatively, or in addition, the one or more numerical features determined from the second distribution can include a median of the positions of neighboring cells as a function of the relative distance to the neighboring cells. Alternatively, or in addition, the one or more numerical features determined from the second distribution can include a mode of the positions of neighboring cells as a function of the relative distance to the neighboring cells.

The method can include, for each of the at least some of the plurality of cells, determining one or more numerical features from a two-dimensional distribution of positions of neighboring cells, and classifying the at least some of the plurality of cells based on the one or more numerical features determined from the two-dimensional distribution. The one or more numerical features determined from the two-dimensional distribution can include a measure of entropy. Alternatively, or in addition, the one or more numerical features determined from the two-dimensional distribution can include a measure of uniformity. Alternatively, or in addition, the one or more numerical features determined from the two-dimensional distribution can include a measure of density.

The method can include determining pixel texture information for the at least some of the plurality of cells, and classifying the at least some of the plurality of cells based on the pixel texture information. The pixel texture information can include first-order pixel texture information. The first-order pixel texture information can include one or more of a mean, a median, a mode, a standard deviation, and a surface area that are determined based on intensity values of pixels in regions of the one or more images that correspond to the cells.

The pixel texture information can include second-order pixel texture information. The second-order pixel texture information can include one or more of a measure of entropy, a measure of uniformity, and a measure of density that are determined based on intensity values of pixels in regions of the one or more images that correspond to the cells.

The one or more images of the cells can be derived from a set of multispectral sample images. The set of multispectral sample images can be spectrally unmixed to produce the one or more images of the cells.

The one or more images of the cells can be derived from a set of red-green-blue (RGB) sample images. The set of RGB sample images can include a single RGB image. Alternatively, the set of RGB sample images can include two or more RGB images.

The set of RGB sample images can be spectrally unmixed to produce the one or more images of the cells.

The set of RGB sample images can be decomposed to produce the one or more images of the cells without spectral unmixing. The set of RGB sample images can be decomposed to produce the one or more images of the cells, and the decomposition can include optical density conversion of the set of RGB sample images.

The one or more images of the cells can include a single image derived from a set of multispectral sample images. The one or more images of the cells can include a single image derived from a set of RGB sample images.

The method can also include any of the other steps and/or features disclosed herein, as appropriate.

In a further aspect, the disclosure features an apparatus that includes an imaging system configured to obtain one or more images of a sample that includes cells, and an electronic processor configured to: (a) determine positions of a plurality of cells in the sample based on the one or more images of the sample; (b) for at least some of the plurality of cells, generate a matrix that includes two-dimensional information about positions of neighboring cells, and determine one or more numerical features based on the information in the matrix; and (c) classify the at least some of the plurality of cells as belonging to at least one of multiple classes based on the numerical features.

Embodiments of the apparatus can include any of the features disclosed herein, as appropriate.

In another aspect, the disclosure features an apparatus that includes an imaging system configured to obtain one or more images of a sample that includes cells, and an electronic processor configured to: (a) determine positions of a plurality of cells in the sample based on the one or more images of the sample; (b) for at least some of the plurality of cells, determine a distribution of neighboring cells as a function of relative angular orientation of the neighboring cells, and determine one or more numerical features from the distribution; and (c) classify the at least some of the plurality of cells as belonging to at least one of multiple classes based on the numerical features.

Embodiments of the apparatus can include any of the features disclosed herein as appropriate.

In a further aspect, the disclosure features a computer program product configured to cause an electronic processor to: (a) determine positions of a plurality of cells in a sample based on one or more images of the sample; (b) for at least some of the plurality of cells, generate a matrix that includes two-dimensional information about positions of neighboring cells, and determine one or more numerical features based on the information in the matrix; and (c) classify the at least some of the plurality of cells as belonging to at least one of multiple classes based on the numerical features.

Embodiments of the computer program product can include any of the features and/or steps disclosed herein, as appropriate.

In another aspect, the disclosure features a computer program product configured to cause an electronic processor to: (a) determine positions of a plurality of cells in a sample based on one or more images of the sample; (b) for at least some of the plurality of cells, determine a distribution of neighboring cells as a function of relative angular orientation of the neighboring cells, and determine one or more numerical features from the distribution; and (c) classify the at least some of the plurality of cells as belonging to at least one of multiple classes based on the numerical features.

Embodiments of the computer program product can include any of the features and/or steps disclosed herein, as appropriate.

Unless otherwise defined, all technical and scientific terms used herein have the same meaning as commonly understood by one of ordinary skill in the art to which this disclosure belongs. Although methods and materials similar or equivalent to those described herein can be used in the practice or testing of the present disclosure, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments are set forth in the accompanying drawings and the description below. Other features and advantages will be apparent from the description, drawings, and claims.

DESCRIPTION OF DRAWINGS

Like reference symbols in the various drawings indicate like elements.

DETAILED DESCRIPTION

Figure 1:
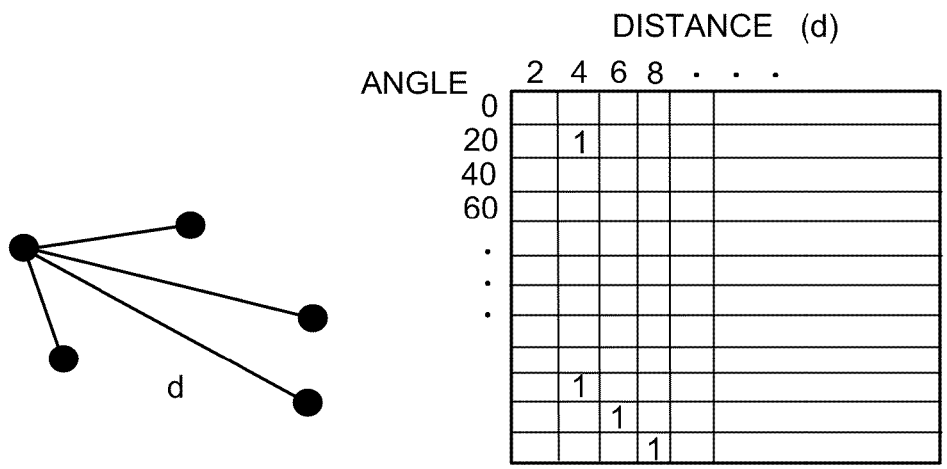
FIG. 1 is a schematic diagram showing a position matrix for a nucleus.

In certain assessment protocols, biological samples are stained with one or more stains, and then images of the stained samples are used to classify regions of the sample into various classes according to criteria such as spectral properties of the various regions and local variations in image intensity. Suitable methods for acquiring spectral images of samples and classifying the samples according to such criteria are disclosed, for example, in: U.S. patent application Ser. No. 11/342,272 entitled "CLASSIFYING IMAGE FEATURES" by Richard Levenson et al., filed on Jan. 27, 2006, and published as U.S. Patent Publication No. US 2006/0245631; and U.S. patent application Ser. No. 11/861,060 entitled "SAMPLE IMAGING AND CLASSIFICATION" by Richard Levenson et al., filed on Sep. 25, 2007. The entire contents of each of the foregoing patent applications are incorporated herein by reference.

When a biological sample includes a plurality of cells that are to be classified, the classification can be based on certain structural arrangements of the cells within the tissue. This structural information can be used to supplement and, in some embodiments, be used in place of, information derived directly from variations in spatial and/or spectral intensities of individual pixels in images of the sample.

In the methods disclosed herein, structural information derived from the determination of the positions of cellular nuclei in a biological tissue sample can be used to classify individual cells as belonging to one of a variety of classes (e.g., cancerous or non-cancerous), and the classification results can then be used for clinical diagnosis and treatment applications. This classification can be useful on its own, or can be used as an aid to a technician, e.g., by directing the technician's attention to particular structures of interest in the sample, and/or by making a provisional assessment of the sample that is later reviewed and approved or refused by the technician.

In some embodiments, information derived from the arrangement of nuclear positions can be used to classify cells. This nuclear tissue architecture information provides quantitative measures of patterns and shapes formed by the distribution of nuclei within the sample. It is important to distinguish the nuclear tissue architecture information, which derives from statistics of the relative positions of nuclei in the sample, from ordinary "pixel texture" information, which derives from the statistics of intensity values at regular locations in a pixel grid.

Information derived from nuclear position measurements can include both one-dimensional and two-dimensional statistics regarding the arrangement of nuclei within the sample. One-dimensional information can include, for example, any information about the distribution of neighboring nuclei relative to the nucleus of a cell to be classified, for which the distribution can be expressed as a function of a single variable; this variable can be the distance between nuclei and the cell to be classified, or the angular orientation of imaginary line segments that connect the nuclei to that cell. Measures which can be derived from a one-dimensional distribution include statistical measurements of the distance distribution or of the angular distribution, such as the mean, median, mode, standard deviation, uniformity, and/or other statistical indices.

Two-dimensional information can include, for example, any information about the distribution of neighboring nuclei relative to the nucleus of a cell to be classified, for which the distribution can be expressed as a function of two variables; for example, the variables can be the distance between nuclei and the cell to be classified, and the angular orientation of imaginary line segments that connect the nuclei to that cell. Two-dimensional information can be represented by a position matrix determined for a cell, which describes the relative position of the surrounding nuclei in terms of their angular and positional distribution. In some embodiments, relative nuclear position information can be expressed in Cartesian terms (e.g., displacement in X and displacement in Y directions). Suitable "nuclear texture" measures can include a position matrix showing the distribution of distances to neighboring nuclei and angular orientations of neighboring nuclei, from which statistical measures can be derived.

The measures derived from relative nuclear position distributions can then be used as input to an automated classifier that assigns each cell to a class based on one-dimensional information, two-dimensional information, or a combination of one-dimensional and two-dimensional information.

Information derived from nuclear position can also be combined with other information about the image such as pixel texture, brightness, and other information, and classification can be based on the combined information to obtain better classification accuracy than is possible with either information set used alone.

Although the present examples are concerned with nuclear position, and use nuclear position to provide an estimate of cell location, other estimates of cell location can also be used in place of, or in addition to, nuclear position, for particular applications. For example, in samples where the membrane of cells are visible, membrane location can be used to develop position matrices in addition to, or instead of, the nuclear position described in the present examples.

The methods disclosed herein include derivation of information based on nuclear positions in sample images; provided the staining procedures are adequately controlled to a sufficient degree that nuclear positions can be accurately determined from the images, the derived information is typically not substantially affected by modest variations in staining or tissue preparation. Classification of cells using position information (e.g., nuclear position information) can therefore be less sensitive to variations in staining procedures than classification methods that rely more heavily on staining density and/or on spectral properties of regions of a sample.

As a first step in the classification of cells using nuclear position information, one or more images of the sample are acquired using an optical imaging system. In some embodiments, the set of acquired images includes multispectral images, and the images are spectrally unmixed to obtain a new set of images. Typically, one or more members of the new set of images is then selected for analysis. For example, the images can be spectrally unmixed to decompose the measured images into a new set of images, each of which corresponds to a single spectral contribution such as a specific stain applied to the sample (e.g., hematoxylin), or to another component such as an autofluorescence component. Methods for spectral unmixing are disclosed, for example, in: U.S. patent application Ser. No. 10/669,101 entitled "SPECTRAL IMAGING OF DEEP TISSUE" by Richard Levenson et al., filed on Sep. 23, 2003, and published as U.S. Patent Publication No. US 2005/0065440; and in PCT Patent Application No. PCT/US2004/031609 entitled "SPECTRAL IMAGING OF BIOLOGICAL SAMPLES" by Richard Levenson et al., filed on Sep. 23, 2004, and published as PCT Patent Publication No. WO2005/040769. The entire contents of each of the foregoing patent applications are incorporated herein by reference.

Alternatively, conventional color (RGB) images can be decomposed into components using an estimate of the color of each stain, preferably using techniques of optical density conversion to approximately linearize the effect of the various stains, and reduce interaction (spectral cross-talk) effects. In some embodiments, a single monochrome or color image can be used without color decomposition or spectral unmixing steps.

Following the selection of one or more suitable image(s), the image(s) is/are analyzed to determine the positions of the nuclei. In some embodiments, for example, the nuclear positions can be determined manually by a system operator (e.g., via a computer display that shows the selected image(s) and permits the operator to indicate positions of individual nuclei). In certain embodiments, identification of nuclear positions is performed automatically by a computer-based algorithm (e.g., a formula-based algorithm, or a machine-learning algorithm such as a trained neural network and/or a genetic algorithm). Nuclear positions are determined for all cells within a selected region of interest of the image to be analyzed. When the positions of the nuclei have been determined, each nucleus within the region of interest is chosen in turn and the distribution of its neighboring nuclei is assessed.

To assess the distribution of neighboring nuclei, a position matrix is constructed. An exemplary position matrix for a particular cell is shown in FIG. 1. The position matrix can be constructed automatically according to operator-specified parameters such as a maximum distance $d_{max}$ at which another nucleus can be considered a neighbor, a distance resolution $\Delta d$ for the matrix ($\Delta d=2$ pixels in FIG. 1), and an angular resolution $\Delta\theta$ for the matrix ($\Delta\theta=20$ degrees in FIG. 1). The elements in the position matrix are initially set to 0, and for each surrounding cell that meets the angle and distance criteria for a given matrix element, the matrix element's value is incremented by 1.

Nuclear position information can be derived directly from images of the sample or from the position matrices for each nucleus in the sample. Nuclear position information typically includes, for example, a variety of one-dimensional statistical measures of the distribution of neighboring nuclei such as the mean, standard deviation, energy, entropy, and density, these measures being expressed as a function of a single variable, such as distance or angular orientation of surrounding nuclei. In some embodiments, this information is determined by collapsing the position matrices into one-dimensional histograms (e.g., one histogram expressed as a function of distance, the other as a function of angular orientation). In other embodiments, some or all of the nuclear position information is determined directly from the statistics of the two-dimensional distribution of positions for the neighboring nuclei.

Exemplary two-dimensional measures derived from the position matrices can include the following:

$$\text{entropy} = \Sigma\Sigma p \log p$$

$$\text{uniformity} = \Sigma\Sigma p^2$$

$$\text{density} = \Sigma\Sigma[p^2/[(k+1)\Delta d]]$$

where the dual sums run over all position matrix elements p, and k is the number of columns (or rows) over which the position matrix information extends. In addition, Haralick et. al. describe measures which can be derived from two-dimensional distribution matrices (such as the position matrices discussed above) in "Textural Features for Image Classification", IEEE Transactions on Systems, Man, and Cybernetics, Vol. SMC-3, pp. 610-621 (1973), the entire contents of which are incorporated herein by reference. The measures described therein can be applied to the nuclear position matrices disclosed herein rather than to the gray-level co-occurrence matrices used in that paper.

The various one-dimensional and two-dimensional measures are used as components in a feature vector associated with each cell to be classified. In addition to one-dimensional and two-dimensional measures derived from the position matrices and/or images, the feature vector can also include other measures that complement the position measures to improve classification accuracy. For example, in some embodiments, the feature vector for each cell also includes measures derived from pixel texture information in regions surrounding the cell. In general, a wide variety of pixel texture information can be included in the feature vector. First-order pixel texture measures derived from a circular region around the nuclear center can include: mean, median, mode, standard deviation, and surface area. Other pixel texture measures can also be derived including, for example, normalized variance and/or measures derived from two-dimensional gray-level co-occurrence matrices. These pixel-based measures can be calculated using pixel intensity values from individual images in the sample image set, such as the signal strength in one spectral component in a set of unmixed spectral images derived from a multispectral image stack or RGB image. Pixel-based measures can also be calculated based on pixel intensity values from one plane of a multispectral image stack or RGB image, or based on pixel intensity values from an image which represents a mixture or combination of several individual images, such as a mean signal strength or summed signal strength. The foregoing automated analysis is repeated for all cells to be classified, to obtain feature vectors for each of the cells.

A variety of different automated classifiers can be used to automatically classify sample cells based on the feature vector information derived from sample images. In particular, machine-learning classifiers such as neural network-based classifiers can be used to classify cells based on nuclear position information, or on nuclear position information and pixel texture information derived from a small region centered on the cell. Other classifiers can also be used, including randomForest-based classifiers and genetic algorithm-based classifiers.

As a first step in using a classifier, the classifier is trained to recognize certain classes of cells based upon feature vectors developed from previously-classified standards. The previously classified standards can include, for example, selected regions of the sample that have been classified manually by a trained technician. Alternatively, or in addition, the standards can include other images which have been correctly classified either by a technician or by another automated classifier.

Random forest-based classifiers can be used to classify sample cells using features derived from images as disclosed herein. In particular, a classifier implemented in the R statistical programming language and based on the randomForest package can be used. The random forest classifier (RFC) is an ensemble classification system, and uses CART trees as the units of the ensemble. The RFC does not require a separate data set for validation, due to the manner in which the ensemble is created. Each CART tree is created using a bootstrap sample of the original data set; cases used in the bootstrap sample are referred to as "in-bag" cases, and those not included are referred to as "out-of-bag" cases. When the classifier reports the prediction error on a per tree basis, only those cases that were out-of-bag for that tree are used in the evaluation. The out-of-bag error estimate for the classifier is the average error estimate for all trees in the ensemble.

The randomForest package includes a number of adjustable parameters. In particular, the number of trees (ntree) and the voting method by the forest (cutoff) can be adjusted. The ntree parameter can be adjusted to accommodate computer memory restrictions and/or allow for modeling of complex relationships. The cutoff parameter can be adjusted to force the classifier to favor one type of error over another (e.g., false positive errors can be favored or disfavored relative to false negative errors). The randomForest package generates a confusion matrix illustrating the performance of the classifier based on predicted values of the out-of-bag error. Information about the relative contributions of the various features that function as input to the classifier is provided in the form of a ranking of the importance of the various features. Receiver operator characteristic curves can be calculated to provide a more complete assessment of classifier performance, and the area under the receiver operator characteristic curves can be determined. These curves can be generated, for example, using the ROCR package implemented in the R statistical language.

Once trained, the classifier can be used to classify cells in a sample of interest based on the nuclear position information and other information such as pixel texture information. Typically, as discussed above, the elements of the feature vector for each cell correspond to measures derived from the positions of neighboring nuclei, and/or to measures derived from pixel texture information. Each feature vector functions as input to the classifier, which then operates on the elements of the feature vector and determines a classification for the associated cell. These operations are repeated until classification of all desired cells in the sample is complete.

The methods disclosed herein can be used to classify a wide variety of different types of samples. In some embodiments, for example, the methods can be used to classify samples taken from prostate glands. In certain embodiments, the methods can be used to classify other types of samples, including samples extracted from other body tissues. The methods can be used to classify portions of the samples according to various classification schemes. For example, portions of the samples can be classified as either cancer cells, or something other than cancer cells. Tissue samples can be classified as either cancerous or benign. In general, samples (and portions thereof) can be classified into a wide variety of different classes based on the nature of particular applications.

The steps described above in connection with various methods for collecting, processing, analyzing, interpreting, and displaying information from samples can be implemented in computer programs using standard programming techniques. Such programs are designed to execute on programmable computers or specifically designed integrated circuits, each comprising an electronic processor, a data storage system (including memory and/or storage elements), at least one input device, and least one output device, such as a display or printer. The program code is applied to input data (e.g., images from the detector) to perform the functions described herein and generate output information (e.g., images showing classified regions of samples, statistical information about sample components, etc.), which is applied to one or more output devices. Each such computer program can be implemented in a high-level procedural or object-oriented programming language, or an assembly or machine language. Furthermore, the language can be a compiled or interpreted language. Each such computer program can be stored on a computer readable storage medium (e.g., CD ROM or magnetic diskette) that when read by a computer can cause the processor in the computer to perform the analysis and control functions described herein.

EXAMPLES

The disclosure is further described in the following examples, which are not intended to limit the scope of the claims.

Example 1

Figure 5:
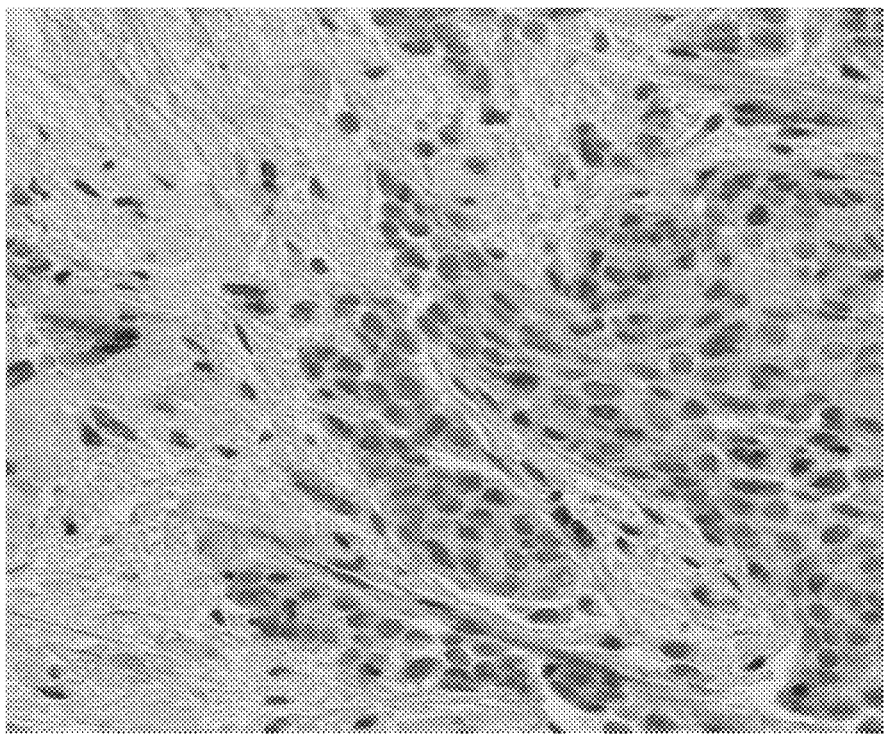
FIG. 5 is an image of a tissue sample that has been treated with a DAB immunohistochemical (IHC) assay and counterstained with hematoxylin.

A set of experiments was performed on images of a tissue section to assess the accuracy of automated classification, and specifically to evaluate the classification of samples on the basis of relative nuclear position information, pixel texture information in the region surrounding the nuclei, and a combination of the two. Analysis of the first image, shown in FIG. 5, led to the manual identification of 397 cellular nuclei. With parameters $d_{max}$=100 pixels, $\Delta d$=20 pixels, $\Delta\theta$=45 degrees, and a circular radius of 5 pixels for assessing statistical measures of pixel textures surrounding the nuclei, various features for each of the identified nuclei were determined and submitted to a validated randomForest automated classifier for classification of each cell as either normal or cancerous. When both nuclear position information and pixel texture information were used in the classification, the error rate was 16% and area under the receiver operator characteristic curve, AUC, was 0.85. When only measures derived from the position matrices (e.g., nuclear position information) were used in the classification, the error rate was 15% and AUC was 0.83. For the image shown in FIG. 5, it was apparent that pixel texture information did not contribute significantly to the accuracy of classification.

Figure 6:
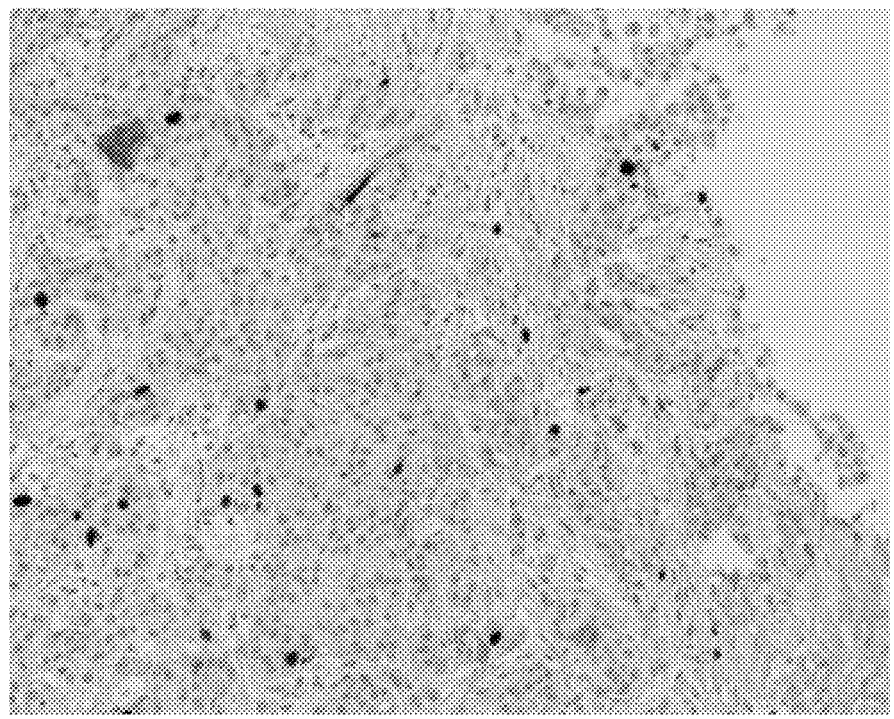
FIG. 6. is an image of a second tissue sample treated with a DAB IHC assay and counterstained with hematoxylin.

A similar classification procedure was applied to a portion of a second image, shown in FIG. 6. Analysis of the second image led to the manual identification of 1132 cellular nuclei, of which 724 were identified as belonging to cancerous cells and 408 were identified as belonging to non-cancerous cells. With parameters $d_{max}$=100 pixels, $\Delta d$=20 pixels, $\Delta\theta$=45 degrees, and a circular radius of 5 pixels for statistical measures of pixel textures surrounding the nuclei, various features for each of the identified nuclei were determined and submitted to a validated randomForest automated classifier. When both nuclear position information and pixel textural information were used in the classification, the error rate was 17% and AUC was 0.875. When only measures derived from the position matrices were used in the classification, the error rate was 35% and AUC was 0.68. For the image shown in FIG. 6, it was apparent that classification on the basis of both nuclear position information and pixel textural information significantly enhanced the accuracy of the classification results.

Example 2

In a second study, four individual images of a sample were acquired under 20× magnification in a microscope imaging system (Aperio Technologies Inc., Vista, Calif.), and each of the color images from the microscope imaging system was decomposed to yield an image corresponding to the hematoxylin component in the sample. One image was selected for analysis from among the four hematoxylin component images, and positions of cell nuclei in the selected image were identified manually by a system operator. Position matrices were constructed for each of the identified nuclei. Parameters used to construct the position matrices were as follows: $d_{max}=100$ pixels, $\Delta d=20$ pixels, and $\Delta\theta=20$ degrees. The position matrices were collapsed to one-dimensional histograms in both distance and angular orientation, and uniformity, mean, and standard deviation measures were extracted from each of the histograms. Two-dimensional measures extracted from the position matrices were entropy, uniformity, and density.

In addition, pixel intensity-based statistical measures were derived from circular regions centered upon the nuclei of each of the cells to be classified. The pixel-based measures included the mean, median, mode, standard deviation, and surface area of pixel intensities in the circular regions. For this analysis, the radius of the circular region was 20 pixels.

The nuclear position information and pixel textural information derived from the image analysis for each cell was then submitted to an automated classifier, and the sample cells were classified. Two different automated classifiers were used. The first was a randomForest classifier, which used nuclear position information from two different subset regions of one image for training and validation, respectively. The second automated classifier used was a neural network-based classifier that incorporated cross-validation by splitting the input data into groups containing 90% and 10% for training and test, respectively. Selection of points was performed at random for each trial. The classification results were compared to manually-supervised classification results for the same image to evaluate the accuracy of the classification method.

Operating on one image selected from the set of four acquired images and using the randomForest classifier, sample cells were classified and then compared to the manually-supervised classification results. Based on the comparison, the accuracy of the automated classification was estimated to be 85% on average. The classification was repeated six times, with accuracies ranging from 85.2% to 85.8%, depending on the random number used to seed the classifier. The AUC was found to be 0.885, and the top 50% of the features were the mode, the angular standard deviation, the angular uniformity, the mean, the median, the entropy, and the density. Some of these features—for example, angular measures—can be derived from one-dimensional analysis of the position information, while others (such as entropy) are derived from the two-dimensional information in the position matrices.

Figure 2A:
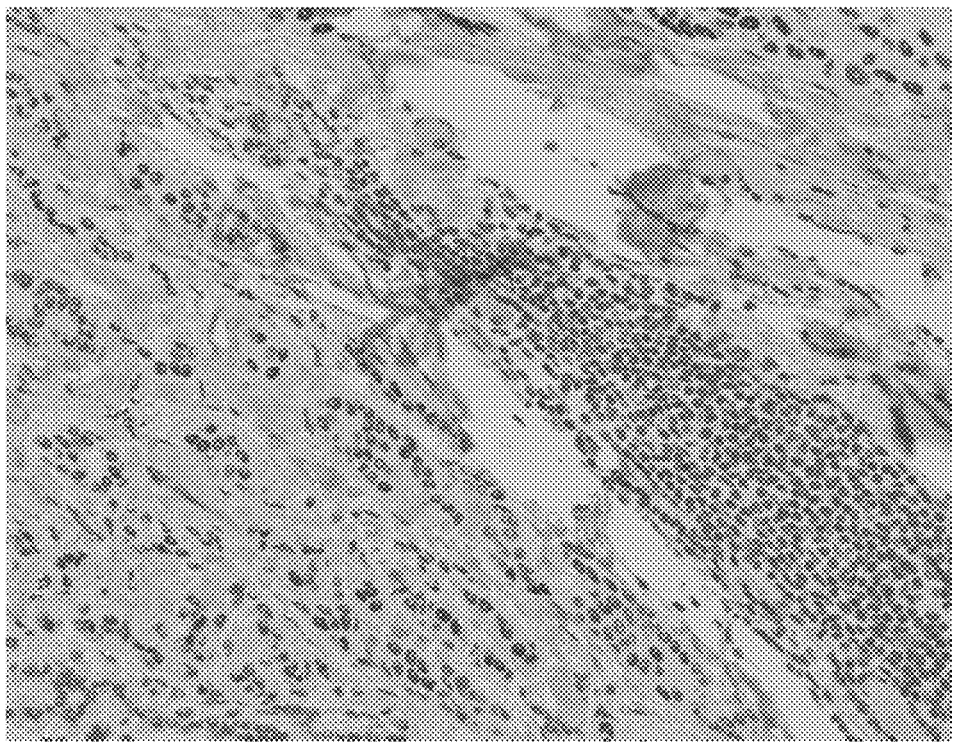
FIG. 2A is an image of a sample where regions of the image have been classified by an automated classification system.
Figure 2B:
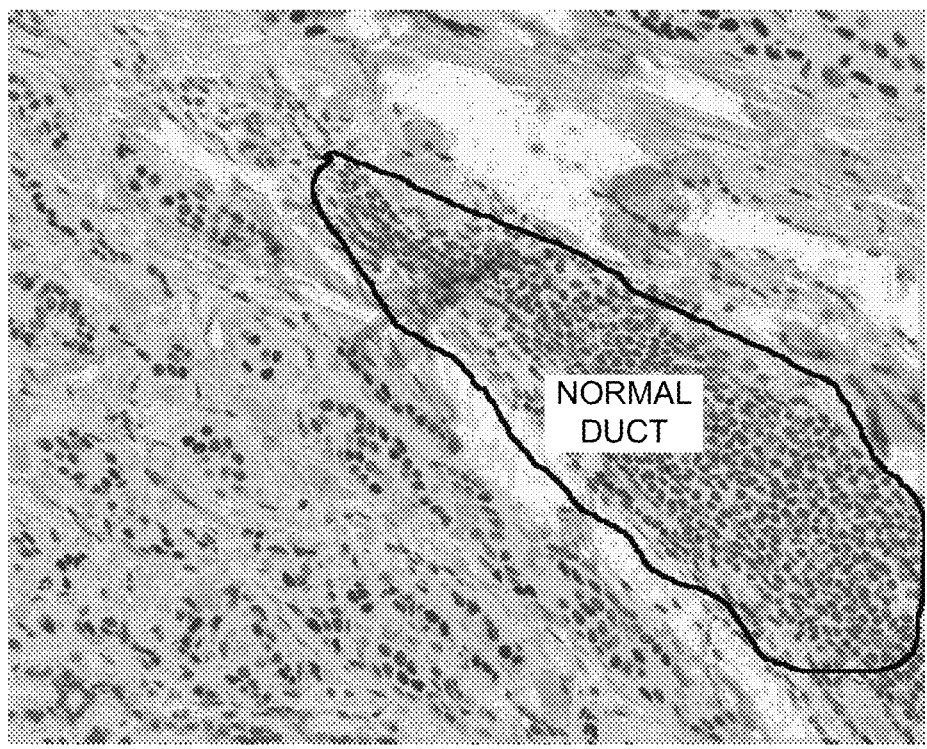
FIG. 2B is an image of the same sample shown in FIG. 2A, where regions of the image have been classified by a manually-supervised classification system.

FIGS. 2A and 2B show a comparison between automated classification results, indicated by shading, and the manually-supervised classification results, for one of the hematoxylin component images. The image in FIG. 2B shows manually-supervised classification of an image of the sample. The image shown in FIG. 2A shows automated classification of the same image. In FIG. 2B, classification was based on pixel texture information derived from the image. Erroneously classified regions of the sample are shown circled in black in FIG. 2B.

Operating on a second image selected from the set of four acquired images and again using the randomForest classifier, a comparison between the automated classification of sample cells and the manually-supervised classification indicated an estimated accuracy of automated classification to be 93% on average (classification repeated twice, with identical accuracy each time). The AUC was found to be 0.97, and the top 50% of the features were the standard deviation, the angular standard deviation, the surface area, the mean, the angular uniformity, the density, and the radial uniformity.

Figure 3:
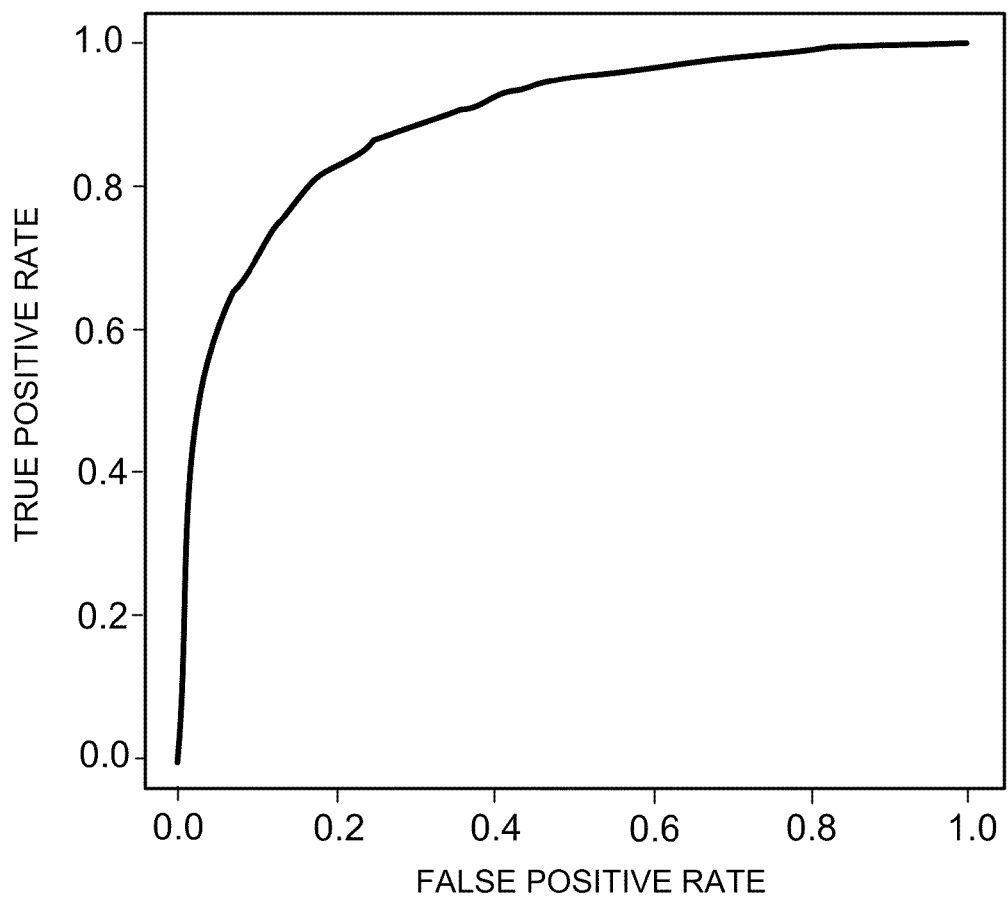
FIG. 3 is a receiver operator characteristic curve showing a relationship between a true positive classification rate and a false positive classification rate for automated classification of a sample.

To assess the effects of using multiple images, the image data from all four of the hematoxylin component images was combined to form a single data set, and this data set was analyzed and classified according to the same procedure used for each of the individual images. The results from the randomForest classifier indicated an automated classification accuracy of 84.5% on average (classification repeated three times with different seeds, with accuracies of 84.5%, 84.8%, and 84.7%). An analysis of the classification error revealed that the error rate was a result of cancerous cells classified as non-cancerous (5%), and non-cancerous cells classified as cancerous (41%). For this classification trial, the AUC was found to be 0.89, and the top 50% of the features were the standard deviation, the mode, the angular standard deviation, the mean, the angular uniformity, the median, and the surface area. FIG. 3 is a receiver operator characteristic curve showing the variation of the true positive identification rate as a function of the false positive identification rate for classification based on the combined image data.

The combined image data from the four images was also classified using the neural network-based classifier with cross-validation. Ten classification trials were run, with accuracy rates ranging from 73% to 81%.

To evaluate the relative contributions of nuclear position information and pixel texture information to the overall accuracy of automated classification, a randomForest classifier was created and validated first using only nuclear position information, and then using only pixel textural information from the circular regions surrounding the nuclear centers. Automated classification based only on nuclear position information yielded an accuracy of 77% with AUC of 0.77 following comparison to the manually-supervised classification; automated classification based only on pixel texture information yielded an accuracy of 79% with AUC of 0.85. Classifying based on either information set individually yielded poorer results than classifying based on the combination of nuclear position information and pixel texture information.

Figure 4:
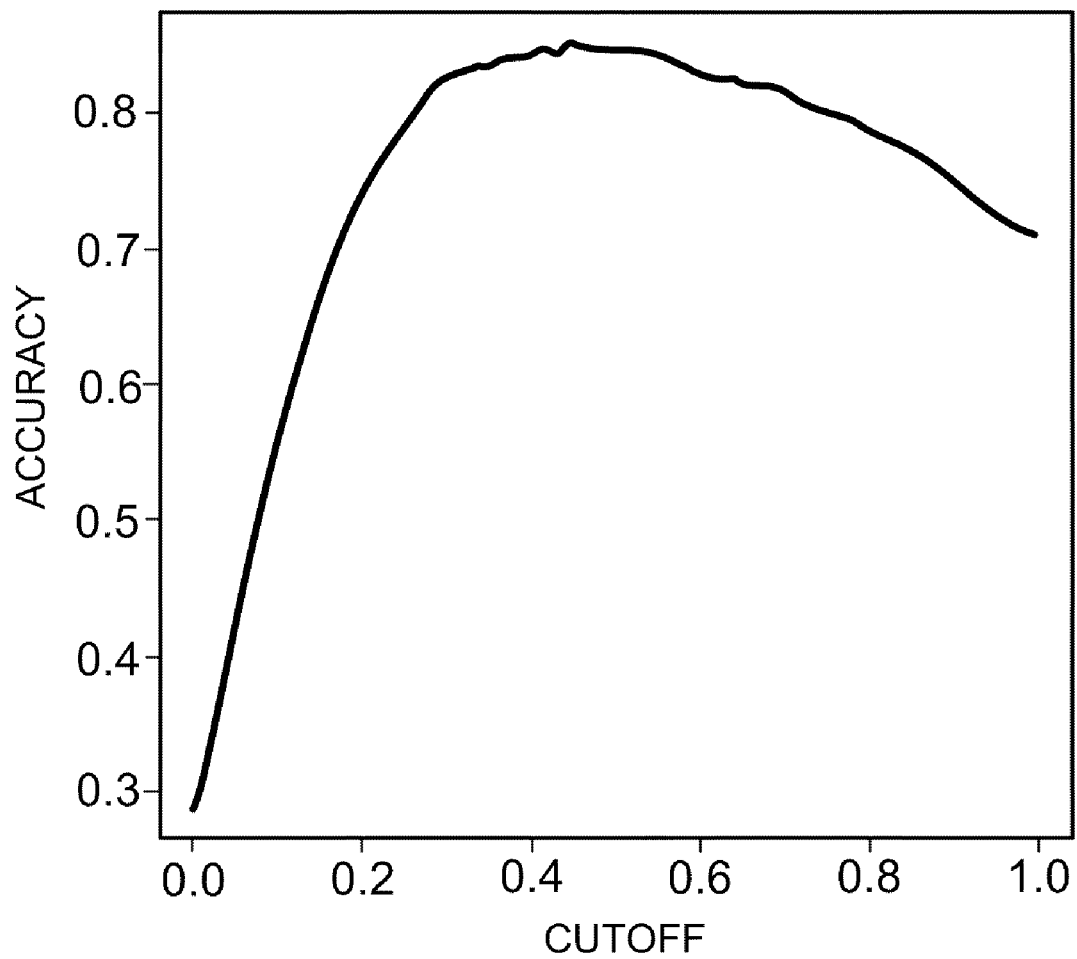
FIG. 4 is a graph showing classification accuracy as a function of cutoff for automated classification of a sample.

The particular data set represented by the images includes an over-representation of cancerous cells relative to non-cancerous cells, as evidenced by the relatively high false-positive error rate (e.g., 41%). FIG. 4 shows a plot of accuracy as a function of cutoff, and further suggests that a more balanced data set would yield higher classification accuracy.

To assess the effects on classification accuracy of a more balanced data set, an additional experiment using the combined image data from the four acquired images was performed. A random group of cancer cells were removed from consideration to create a class-balanced reduced data set, and the reduced data set was automatically classified with the randomForest classifier. Classification accuracy, determined by comparing the automatic classification results to the manually-supervised classification results, was determined to be 81%. The error rate at which cancerous cells were classified as non-cancerous was 15%, and the error rate at which non-cancerous cells were classified as cancerous was 22%. The AUC was measured as 0.88, and the top 50% of the features were mode, angular standard deviation, mean, standard deviation, median, entropy, and radial uniformity. Using the randomForest classifier and only these features, a classification accuracy rate of 79.5% was achieved.

Example 3

In a third study, immunohistochemical images of both cancerous and non-cancerous prostate gland were classified using the methods disclosed herein to investigate the discriminatory ability of the methods. Eight tissue microarray samples were obtained from eight different patients. The samples, each about 5 microns thick and 600 microns in diameter, were embedded in paraffin and stained with hematoxylin and DAB. Images of each of the samples were obtained.

Figure 7A:
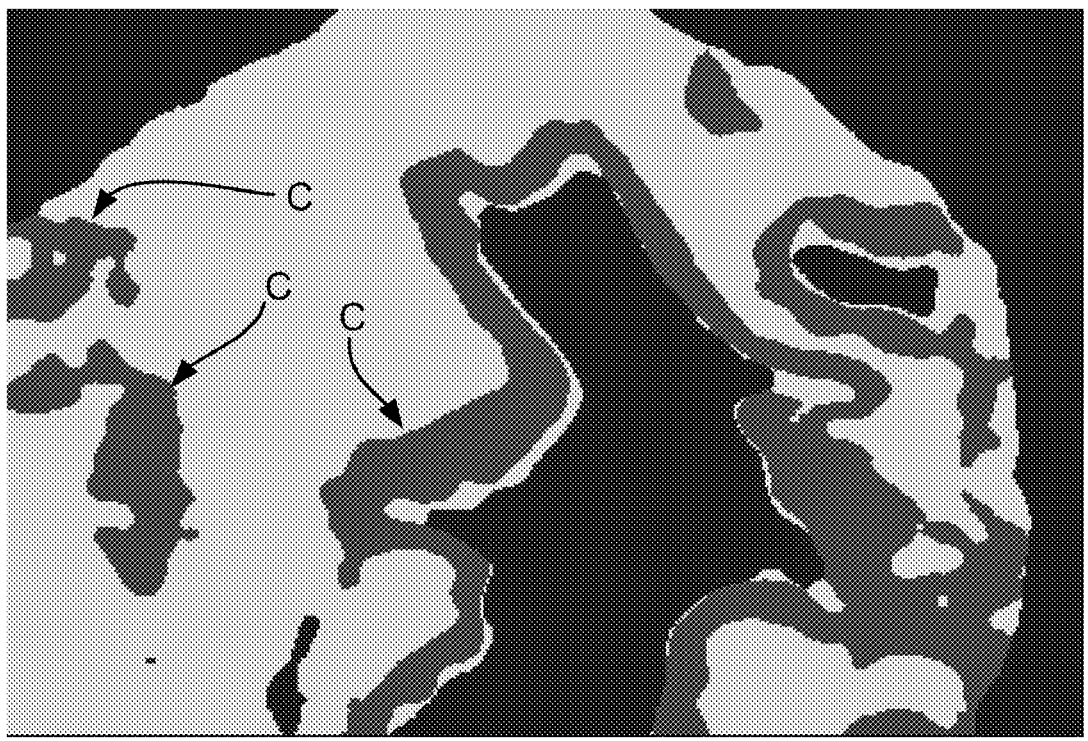
FIG. 7A is an image of a tissue sample showing cancerous regions identified by a pixel texture-based classifier.
Figure 7B:
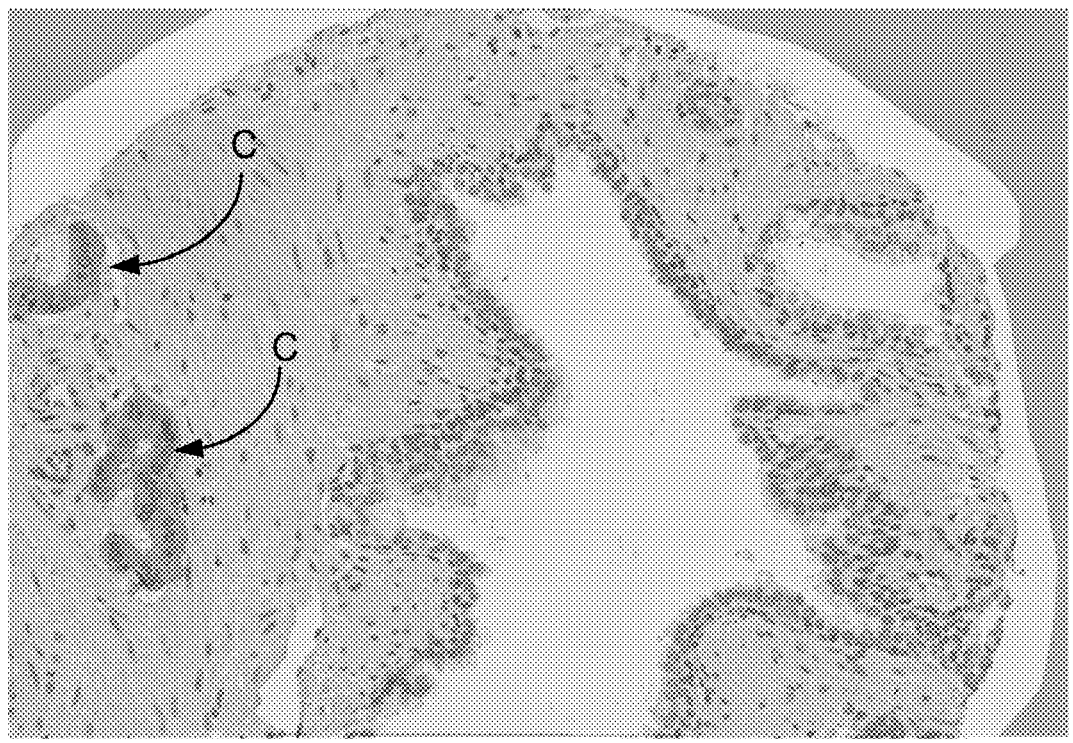
FIG. 7B is an image of the same tissue sample as in FIG. 7A showing cancerous regions identified by a technician.

In each of the eight images, nuclear centers were manually identified. In total, 8931 nuclear centers were identified, with 4391 (about 49%) designated as non-cancerous. Each of the eight images was also classified using pixel texture-based methods to identify a region of interest (e.g., a region that includes prostate gland cells) in each image. The images were spectrally unmixed into planes corresponding to the hematoxylin and DAB immunohistochemical stains. Using pixel texture-based methods, an automated classification system can guide a system operator to a region of interest in a sample, without requiring the operator's manual intervention. FIG. 7A shows an example of a region of interest identified in one sample using pixel texture-based classification methods. In FIG. 7A, cancerous cells identified using the texture-based methods are shaded medium grey, and labeled "C." For comparison, an image of the same region of interest in the sample in shown in FIG. 7B; cancerous regions identified by a pathologist are shaded medium grey and labeled "C."

In each of the eight images, following identification of a suitable region of interest, the methods disclosed herein were used to classify cells within the region of interest. Position matrices were constructed with parameter values $d_{max}=100$ pixels, $\Delta d=20$ pixels, and $\Delta \theta=20$ degrees. Features were extracted from the position matrices as discussed above. For each nuclear center, a total of 14 features were obtained: nine features were extracted from relative nuclear position matrices, and five features (mean, median, mode, surface area, and standard deviation) were derived from nuclear texture information (with a nuclear texture radius=20 pixels). Nuclear texture information was determined from the hematoxylin plane of the images. Using a randomForest algorithm, classifiers were developed and validated. The number of trees was set to 500. Independent classifiers were built with all 14 features, with only the features extracted from relative nuclear position co-occurrence matrices, and with only the features derived from nuclear texture information, to evaluate the contribution of different types of features to overall classifier performance.

Table 1 shows the confusion matrix obtained from a classifier built with all 14 features.

TABLE 1

|  | Non cancer | Cancer | Class Error Rate |
| --- | --- | --- | --- |
| Non cancer | 3400 | 991 | 0.23 |
| Cancer | 838 | 3702 | 0.18 |

Figure 8:
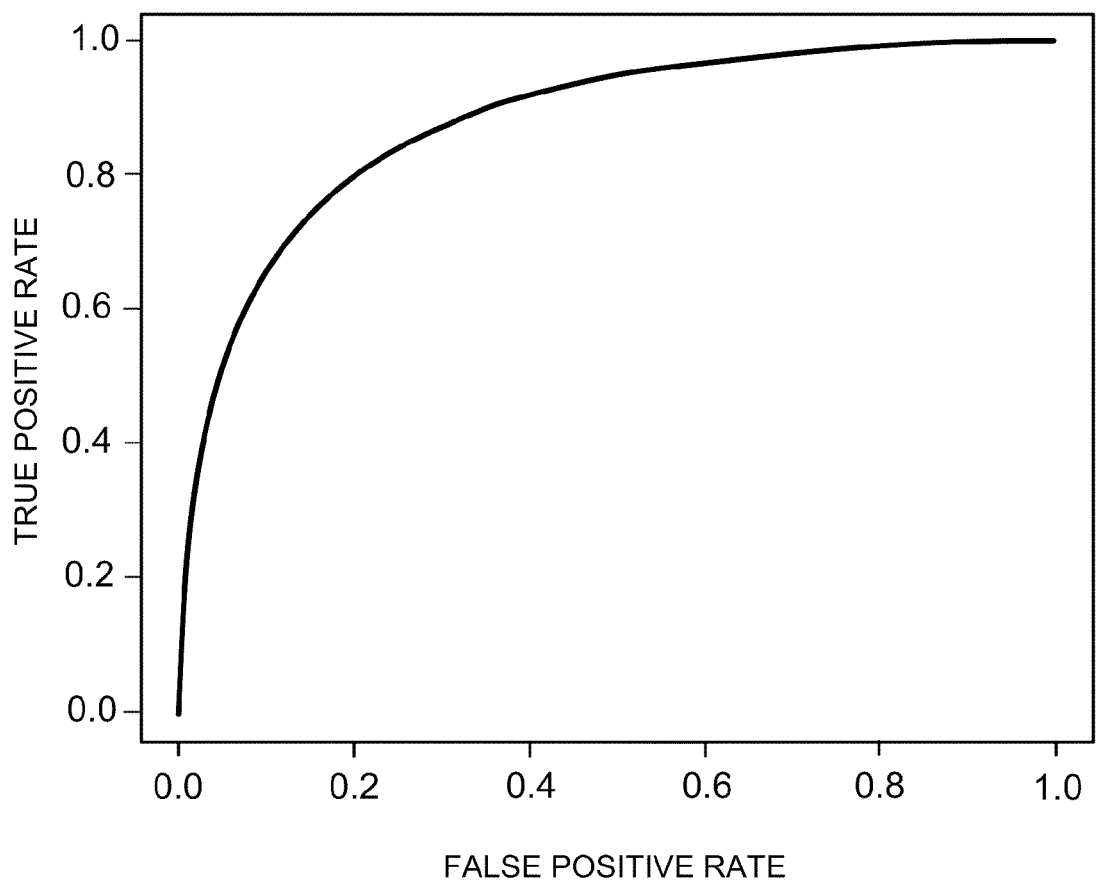
FIG. 8 is a receiver operator characteristic curve derived from classification of sample images using a classifier built with both relative nuclear position-based features and texture-based features.
Figure 9:
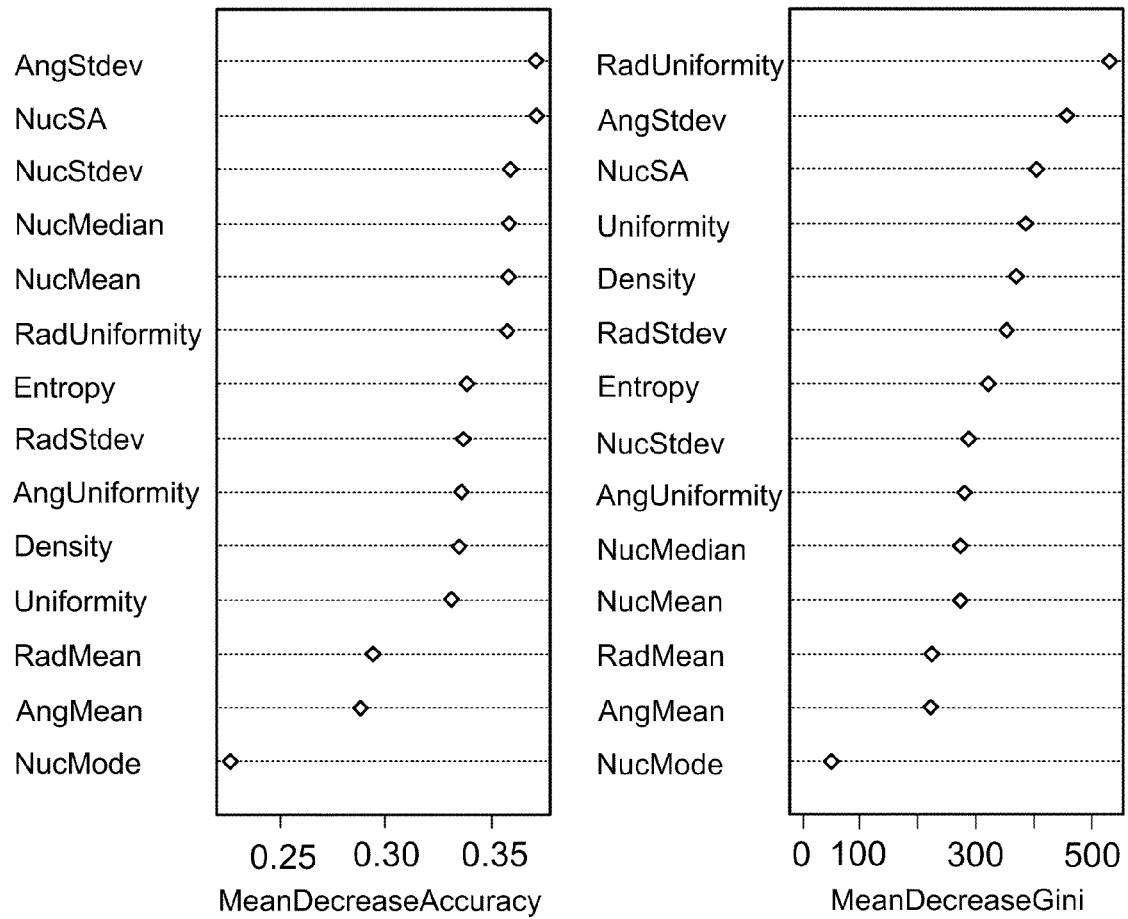
FIG. 9 is a chart showing relative contributions of 14 different features to classifier accuracy and to a splitting metric.

Operating on all of the images, the out-of-bag error rate was 20.5%. The receiver operator characteristic curve for this classification is shown in FIG. 8. The area under the curve is 0.88. Each of the 14 features was assessed for its relative contribution to the classifier (based on the accuracy of the classification results obtained), and for its influence on the randomForest splitting metric. FIG. 9 shows the results of these assessments. On the left side of FIG. 9, each of the 14 features is ranked according to its relative contribution to the accuracy of the classifier. On the right side of FIG. 9, each of the 14 features is ranked according to its influence on the splitting metric.

Table 2 shows the confusion matrix obtained from a classifier built with only the nine features derived from relative nuclear position co-occurrence matrices.

TABLE 2

|  | Non cancer | Cancer | Class Error Rate |
| --- | --- | --- | --- |
| Non cancer | 3228 | 1163 | 0.26 |
| Cancer | 1004 | 3536 | 0.22 |

Figure 10:
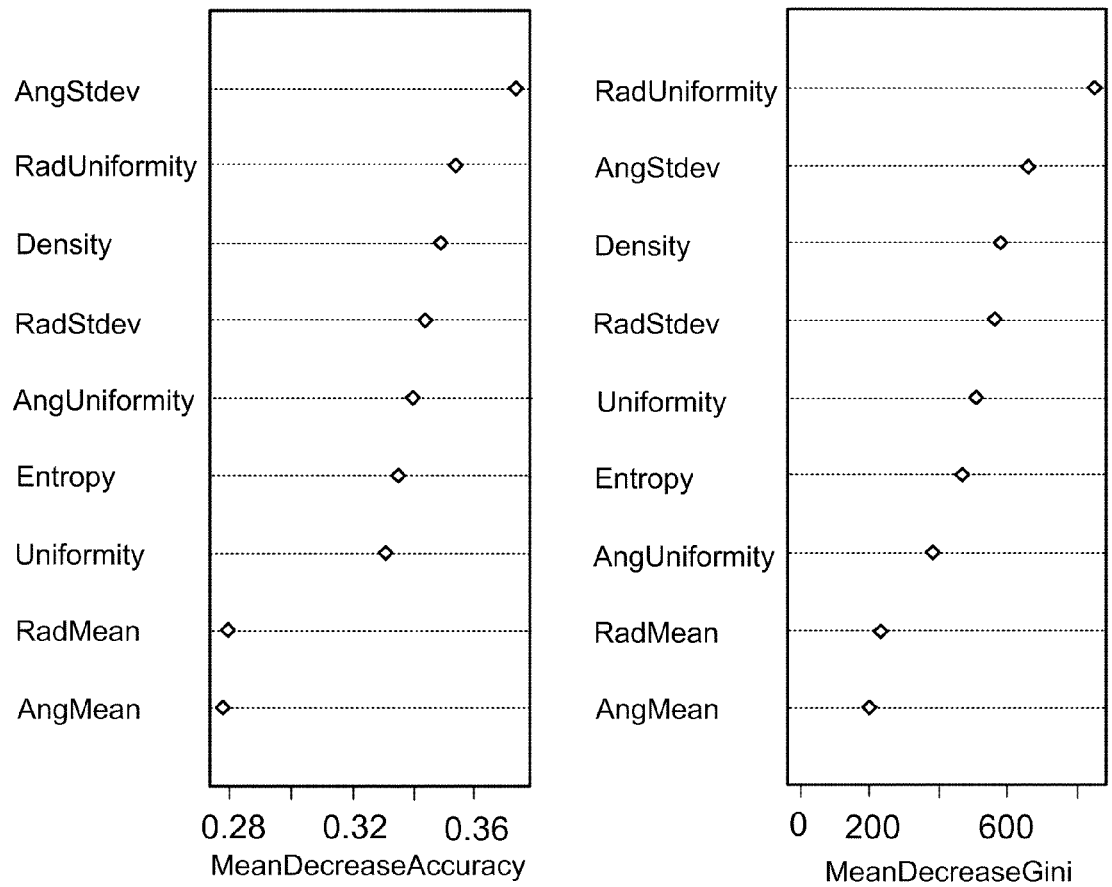
FIG. 10 is a chart showing relative contributions of nine different features to classifier accuracy and to a splitting metric.

The out-of-bag error rate for this classifier, operating on all eight of the images, was 24.3%. The area under the receiver operator characteristic was 0.83. FIG. 10 shows the results of assessing the contributions of each of the nine features to the classifier. On the left side of FIG. 10, the features are ranked in order of their contribution to the accuracy of the classifier. On the right side of FIG. 10, the features are ranked in order of their influence on the splitting metric.

Table 3 shows the confusion matrix obtained from a classifier built with only the five features derived from nuclear texture information.

TABLE 3

|  | Non cancer | Cancer | Class Error Rate |
| --- | --- | --- | --- |
| Non cancer | 2758 | 1633 | 0.37 |
| Cancer | 2158 | 2382 | 0.48 |

For this classifier operating on all eight images, the out-of-bag error rate was 42.5%, and the area under the receiver operator characteristic curve was 0.60.

Based on the classification results for each of the three classifiers in this study, for small data sets, the use of both features derived from relative nuclear position co-occurrence matrices and from nuclear texture information (e.g., all 14 features, as discussed above) assists in the discrimination between normal and cancerous prostate gland cells. Improved classification performance (e.g., accuracy) is obtained relative to classifications based on nuclear texture information alone.

Other Embodiments

A number of embodiments have been described. Nevertheless, it will be understood that various modifications may be made without departing from the spirit and scope of the disclosure. For example, in some embodiments, nuclear position and/or pixel texture information can be combined with other information such as spectral information to further increase the accuracy of automated classification results. Multiple sample images, each having different spectral information, can be analyzed and the information therefrom combined with nuclear position and/or pixel texture information. Features derived from any of these different types of information can be used to classify samples.

The methods disclosed herein can be used with a variety of classification schemes and/or scoring systems. For example, in certain embodiments, the methods disclosed herein can be used in Gleason scoring for classifying samples that include cancerous cells such as prostate cells. In Gleason scoring, structural features of a sample are identified and used to assign a certain score (e.g., a Gleason score) to an image of the sample for purposes of identifying potentially cancerous samples. Structural features that are used to assign the Gleason score include, for example, a relative organization of nuclei in certain regions of the sample. Methods for Gleason scoring are disclosed, for example, in: A. De la Taille et al., "Evaluation of the interobserver reproducibility of Gleason grading of prostatic adenocarcinoma using tissue microarrays," Hum Pathol., vol. 34, No. 5. (May 2003), pp. 444-449; and E. B. Smith et al., "Gleason scores of prostate biopsy and radical prostatectomy specimens over the past 10 years. Is there evidence for systematic upgrading?" Cancer, vol. 94, no. 8, 2002, pp. 2282-2287. The entire contents of each of these references is incorporated herein by reference.

Other embodiments are within the scope of the following claims.

What is claimed is:

1. A method, comprising:
   determining positions of a plurality of cells based on one or more images of the cells;
   for at least some of the plurality of cells, generating a matrix comprising two-dimensional information about positions of neighboring cells, and determining one or more numerical features based on the information in the matrix; and
   classifying the at least some of the plurality of cells as belonging to at least one of multiple classes based on the numerical features.

2. The method of claim 1, wherein determining positions of a plurality of cells comprises determining positions of nuclei of the cells.

3. The method of claim 2, wherein the positions of the nuclei are determined automatically from the one or more images.

4. The method of claim 2, wherein the matrix comprises information about positions of the nuclei of neighboring cells relative to the nucleus of a cell corresponding to the matrix.

5. The method of claim 4, wherein the matrix comprises information about positions of the nuclei of neighboring cells as a function of distance between the neighboring nuclei and the nucleus of the cell corresponding to the matrix.

6. The method of claim 4, wherein the matrix comprises information about positions of the nuclei of neighboring cells as a function of angular orientation relative to the nucleus of the cell corresponding to the matrix.

7. The method of claim 4, wherein the matrix comprises information about positions of the nuclei of neighboring cells as a function of distance along a first coordinate axis between the neighboring nuclei and the nucleus of the cell corresponding to the matrix, and wherein the matrix further comprises information about positions of the neighboring cells as a function of distance along a second coordinate axis between the neighboring nuclei and the nucleus of the cell corresponding to the matrix, the second coordinate axis being orthogonal to the first coordinate axis.

8. The method of claim 1, wherein determining positions of a plurality of cells comprises determining positions of one or more structural features of the cells.

9. The method of claim 8, wherein the one or more structural features comprises a cellular membrane.

10. The method of claim 8, wherein the one or more structural features comprises two or more structural features.

11. The method of claim 1, wherein the two-dimensional information comprises position information as a function of two quantities, and wherein the matrix comprises a first dimension corresponding to one of the quantities and a second dimension corresponding to the other of the quantities.

12. The method of claim 11, wherein the two-dimensional information varies as a function of one of the quantities along the first dimension of the matrix, and the two-dimensional information varies as a function of the other quantity along the second dimension of the matrix.

13. The method of claim 1, wherein the at least one of multiple classes comprises two classes.

14. The method of claim 13, wherein the two classes correspond to cancerous cells and non-cancerous cells.

15. The method of claim 1, wherein the at least one of multiple classes comprises more than two classes.

16. The method of claim 1, wherein the one or more numerical features comprises at least one one-dimensional feature derived from a distribution of the positions of neighboring cells.

17. The method of claim 16, wherein the distribution is derived from the elements of the matrix.

18. The method of claim 17, wherein the distribution is derived by summing elements along one dimension of the matrix.

19. The method of claim 16, wherein the at least one one-dimensional feature is derived from a distribution of the positions of neighboring cells as a function of distance between the neighboring cells and a cell corresponding to the matrix.

20. The method of claim 16, wherein the at least one one-dimensional features is derived from a distribution of the positions of neighboring cells as a function of angular orientation relative to a cell corresponding to the matrix.

21. The method of claim 16, wherein the at least one one-dimensional feature comprises a mean of the positions of neighboring cells.

22. The method of claim 16, wherein the at least one one-dimensional feature comprises a standard deviation of the positions of neighboring cells.

23. The method of claim 16, wherein the at least one one-dimensional feature comprises a median of the positions of neighboring cells.

24. The method of claim 16, wherein the at least one one-dimensional feature comprises a mode of the positions of neighboring cells.

25. The method of claim 1, wherein the one or more numerical features comprises at least one two-dimensional feature derived from a distribution of the positions of neighboring cells.

26. The method of claim 25, wherein the distribution is derived from the elements of the matrix.

27. The method of claim 25, wherein the at least one two-dimensional feature is derived from a distribution of the positions of neighboring cells as a function of distance between the neighboring cells and a cell corresponding to the matrix, and as a function of angular orientation of the neighboring cells relative to the cell corresponding to the matrix.

28. The method of claim 25, wherein the at least one two-dimensional feature is derived from a distribution of the positions of neighboring cells as a function of distance between the neighboring cells and a cell corresponding to the matrix along a first coordinate direction, and as a function of distance between the neighboring cells and the cell corresponding to the matrix along a second coordinate direction orthogonal to the first coordinate direction.

29. The method of claim 25, wherein the at least one two-dimensional feature comprises a measure of entropy based on the distribution of the positions of neighboring cells.

30. The method of claim 25, wherein the at least one two-dimensional feature comprises a measure of uniformity based on the distribution of the positions of neighboring cells.

31. The method of claim 25, wherein the at least one two-dimensional feature comprises a measure of density based on the distribution of the positions of neighboring cells.

32. The method of claim 1, wherein the one or more numerical features comprises at least one one-dimensional feature and at least one two-dimensional feature, the features being derived from a distribution of the positions of neighboring cells.

33. The method of claim 32, wherein the at least one one-dimensional feature and the at least one two-dimensional feature are derived from a distribution of the positions of neighboring cells, as a function of relative distance and angular orientation between the neighboring cells and a cell that corresponds to the matrix.

34. The method of claim 32, wherein the at least one one-dimensional feature and the at least one two-dimensional feature are derived from a distribution of the positions of neighboring cells, as a function of relative distance along each of two orthogonal coordinate directions, between the neighboring cells and a cell that corresponds to the matrix.

35. The method of claim 32, wherein the at least one one-dimensional feature comprises at least one of a mean, a standard deviation, a median, and a mode of a distribution of the positions of neighboring cells, as a function of distance between the neighboring cells and a cell that corresponds to the matrix.

36. The method of claim 32, wherein the at least one one-dimensional feature comprises at least one of a mean, a standard deviation, a median, and a mode of a distribution of the positions of neighboring cells, as a function of an angular orientation of the neighboring cells relative to a cell that corresponds to the matrix.

37. The method of claim 32, wherein the at least one two-dimensional feature comprises at least one of a measure of entropy, a measure of uniformity, and a measure of density, based on the distribution of the positions of neighboring cells.

38. The method of claim 1, further comprising determining pixel texture information for the at least some of the plurality of cells, and classifying the at least some of the plurality of cells based on the pixel texture information.

39. The method of claim 38, wherein the pixel texture information comprises first-order pixel texture information.

40. The method of claim 39, wherein the first-order pixel texture information comprises one or more of a mean, a median, a mode, a standard deviation, and a surface area that are determined based on intensity values of pixels in regions of the one or more images that correspond to the cells.

41. The method of claim 38, wherein the pixel texture information comprises second-order pixel texture information.

42. The method of claim 41, wherein the second-order pixel texture information comprises one or more of a measure of entropy, a measure of uniformity, and a measure of density that are determined based on intensity values of pixels in regions of the one or more images that correspond to the cells.

43. The method of claim 1, wherein the one or more images of the cells are derived from a set of multispectral sample images.

44. The method of claim 43, wherein the set of multispectral sample images are spectrally unmixed to produce the one or more images of the cells.

45. The method of claim 1, wherein the one or more images of the cells are derived from a set of red-green-blue (RGB) sample images.

46. The method of claim 45, wherein the set of RGB sample images comprises a single RGB image.

47. The method of claim 45, wherein the set of RGB sample images comprises two or more RGB images.

48. The method of claim 45, wherein the set of RGB sample images are spectrally unmixed to produce the one or more images of the cells.

49. The method of claim 45, wherein the set of RGB sample images are decomposed to produce the one or more images of the cells without spectral unmixing.

50. The method of claim 49, wherein the set of RGB sample images are decomposed to produce the one or more images of the cells, and wherein the decomposition comprises optical density conversion of the set of RGB sample images.

51. The method of claim 1, wherein the one or more images of the cells comprises a single image derived from a set of multispectral sample images.

52. The method of claim 1, wherein the one or more images of the cells comprises a single image derived from a set of RGB sample images.

53. A method, comprising:
   determining positions of a plurality of cells based on one or more images of the cells;
   for at least some of the plurality of cells, determining a distribution of neighboring cells as a function of relative angular orientation of the neighboring cells, and determining one or more numerical features from the distribution; and
   classifying the at least some of the plurality of cells as belonging to at least one of multiple classes based on the numerical features.

54. The method of claim 53, wherein determining positions of a plurality of cells comprises determining positions of nuclei of the cells.

55. The method of claim 54, wherein the positions of the nuclei are determined automatically from the one or more images.

56. The method of claim 53, wherein determining positions of a plurality of cells comprises determining positions of one or more structural features of the cells.

57. The method of claim 53, further comprising determining a second distribution of neighboring cells as a function of relative distance to the neighboring cells, determining one or more numerical features from the second distribution, and classifying the at least some of the plurality of cells based on numerical features determined from the second distribution.

58. The method of claim 53, further comprising, for each of the at least some of the plurality of cells, generating a matrix that comprises information about the relative angular orientation of neighboring cells.

59. The method of claim 58, wherein the matrix further comprises information about relative distance to the neighboring cells.

60. The method of claim 58, wherein the distribution of neighboring cells as a function of relative angular orientation of the neighboring cells is determined from elements of the matrix.

61. The method of claim 53, wherein the at least one of multiple classes comprises two classes.

62. The method of claim 61, wherein the two classes correspond to cancerous cells and non-cancerous cells.

63. The method of claim 53, wherein the at least one of multiple classes comprises more than two classes.

64. The method of claim 53, wherein the one or more numerical features comprises a mean of the positions of neighboring cells as a function of the relative angular orientation of the neighboring cells.

65. The method of claim 53, wherein the one or more numerical features comprises a standard deviation of the positions of neighboring cells as a function of the relative angular orientation of the neighboring cells.

66. The method of claim 53, wherein the one or more numerical features comprises a median of the positions of neighboring cells as a function of the relative angular orientation of the neighboring cells.

67. The method of claim 53, wherein the one or more numerical features comprises a mode of the positions of neighboring cells as a function of the relative angular orientation of the neighboring cells.

68. The method of claim 57, wherein the one or more numerical features determined from the second distribution comprises a mean of the positions of neighboring cells as a function of the relative distance to the neighboring cells.

69. The method of claim 57, wherein the one or more numerical features determined from the second distribution comprises a standard deviation of the positions of neighboring cells as a function of the relative distance to the neighboring cells.

70. The method of claim 57, wherein the one or more numerical features determined from the second distribution comprises a median of the positions of neighboring cells as a function of the relative distance to the neighboring cells.

71. The method of claim 57, wherein the one or more numerical features determined from the second distribution comprises a mode of the positions of neighboring cells as a function of the relative distance to the neighboring cells.

72. The method of claim 53, further comprising, for each of the at least some of the plurality of cells, determining one or more numerical features from a two-dimensional distribution of positions of neighboring cells, and classifying the at least some of the plurality of cells based on the one or more numerical features determined from the two-dimensional distribution.

73. The method of claim 72, wherein the one or more numerical features determined from the two-dimensional distribution comprises a measure of entropy.

74. The method of claim 72, wherein the one or more numerical features determined from the two-dimensional distribution comprises a measure of uniformity.

75. The method of claim 72, wherein the one or more numerical features determined from the two-dimensional distribution comprises a measure of density.

76. The method of claim 53, further comprising determining pixel texture information for the at least some of the plurality of cells, and classifying the at least some of the plurality of cells based on the pixel texture information.

77. The method of claim 76, wherein the pixel texture information comprises first-order pixel texture information.

78. The method of claim 77, wherein the first-order pixel texture information comprises one or more of a mean, a median, a mode, a standard deviation, and a surface area that are determined based on intensity values of pixels in regions of the one or more images that correspond to the cells.

79. The method of claim 76, wherein the pixel texture information comprises second-order pixel texture information.

80. The method of claim 79, wherein the second-order pixel texture information comprises one or more of a measure of entropy, a measure of uniformity, and a measure of density that are determined based on intensity values of pixels in regions of the one or more images that correspond to the cells.

81. The method of claim 53, wherein the one or more images of the cells are derived from a set of multispectral sample images.

82. The method of claim 81, wherein the set of multispectral sample images are spectrally unmixed to produce the one or more images of the cells.

83. The method of claim 53, wherein the one or more images of the cells are derived from a set of red-green-blue (RGB) sample images.

84. The method of claim 83, wherein the set of RGB sample images comprises a single RGB image.

85. The method of claim 83, wherein the set of RGB sample images comprises two or more RGB images.

86. The method of claim 83, wherein the set of RGB sample images are spectrally unmixed to produce the one or more images of the cells.

87. The method of claim 83, wherein the set of RGB sample images are decomposed to produce the one or more images of the cells without spectral unmixing.

88. The method of claim 87, wherein the set of RGB sample images are decomposed to produce the one or more images of the cells, and wherein the decomposition comprises optical density conversion of the set of RGB sample images.

89. The method of claim 53, wherein the one or more images of the cells comprises a single image derived from a set of multispectral sample images.

90. The method of claim 53, wherein the one or more images of the cells comprises a single image derived from a set of RGB sample images.

91. An apparatus, comprising:
an imaging system configured to obtain one or more images of a sample comprising cells; and
an electronic processor configured to:
determine positions of a plurality of cells in the sample based on the one or more images of the sample;
for at least some of the plurality of cells, generate a matrix comprising two-dimensional information about positions of neighboring cells, and determine one or more numerical features based on the information in the matrix; and
classify the at least some of the plurality of cells as belonging to at least one of multiple classes based on the numerical features.

92. An apparatus, comprising:
an imaging system configured to obtain one or more images of a sample comprising cells; and
an electronic processor configured to:
determine positions of a plurality of cells in the sample based on the one or more images of the sample;
for at least some of the plurality of cells, determine a distribution of neighboring cells as a function of relative angular orientation of the neighboring cells, and determine one or more numerical features from the distribution; and
classify the at least some of the plurality of cells as belonging to at least one of multiple classes based on the numerical features.

93. A computer program product configured to cause an electronic processor to:
determine positions of a plurality of cells in a sample based on one or more images of the sample;
for at least some of the plurality of cells, generate a matrix comprising two-dimensional information about positions of neighboring cells, and determine one or more numerical features based on the information in the matrix; and classify the at least some of the plurality of cells as belonging to at least one of multiple classes based on the numerical features.

94. A computer program product configured to cause an electronic processor to:

determine positions of a plurality of cells in a sample based on one or more images of the sample;

for at least some of the plurality of cells, determine a distribution of neighboring cells as a function of relative angular orientation of the neighboring cells, and determine one or more numerical features from the distribution; and classify the at least some of the plurality of cells as belonging to at least one of multiple classes based on the numerical features.

* * * * *